United States Patent [19]
Niles et al.

[11] Patent Number: 4,815,600
[45] Date of Patent: Mar. 28, 1989

[54] STORAGE CONTAINER FOR DISKETTES

[75] Inventors: Gerald J. Niles; Davis W. Chamberlin, both of St. Paul; Carl S. Ahlberg, Minneapolis, all of Minn.

[73] Assignee: Minnesota Mining and Manufacturing Company, Saint Paul, Minn.

[21] Appl. No.: 141,278

[22] Filed: Jan. 6, 1988

[51] Int. Cl.⁴ .............................................. B65D 1/36
[52] U.S. Cl. .................................... 206/444; 206/561
[58] Field of Search ....................... 206/561, 444, 387

[56] References Cited

U.S. PATENT DOCUMENTS

| | | | |
|---|---|---|---|
| 4,153,178 | 5/1979 | Weavers | 220/306 |
| 4,164,309 | 8/1979 | Staats | 224/45 R |
| 4,177,896 | 12/1979 | Weavers et al. | 206/387 |
| 4,211,337 | 7/1980 | Weavers et al. | 220/341 |
| 4,307,809 | 12/1981 | Haswell | 211/40 |
| 4,312,548 | 1/1982 | Posso | 312/9 |
| 4,498,583 | 2/1985 | Long et al. | 206/444 |
| 4,676,372 | 6/1987 | Rager | 206/444 X |
| 4,696,401 | 9/1987 | Wallace | 206/387 X |
| 4,703,853 | 11/1987 | Burns | 206/387 |
| 4,712,679 | 12/1987 | Lowe | 206/387 |

FOREIGN PATENT DOCUMENTS 162999 12/1985 European Pat. Off. ............ 206/387
2453842 5/1976 Fed. Rep. of Germany ...... 206/387

Primary Examiner—William Price
Attorney, Agent, or Firm—Kinney & Lange

[57] ABSTRACT

A filing rack for a plurality of diskettes arranged in a front-to-back manner includes a plurality of slots for trapping the diskettes in an upright position and a plurality of ramps for supporting a portion of each diskette in an alternative resting position. The rack includes pairs of radius surfaces which translate a horizontal force applied to the front face of a diskette in its upright position into a force which lifts the diskette from its associated slot and permits the diskette to move into its alternative resting position.

29 Claims, 3 Drawing Sheets

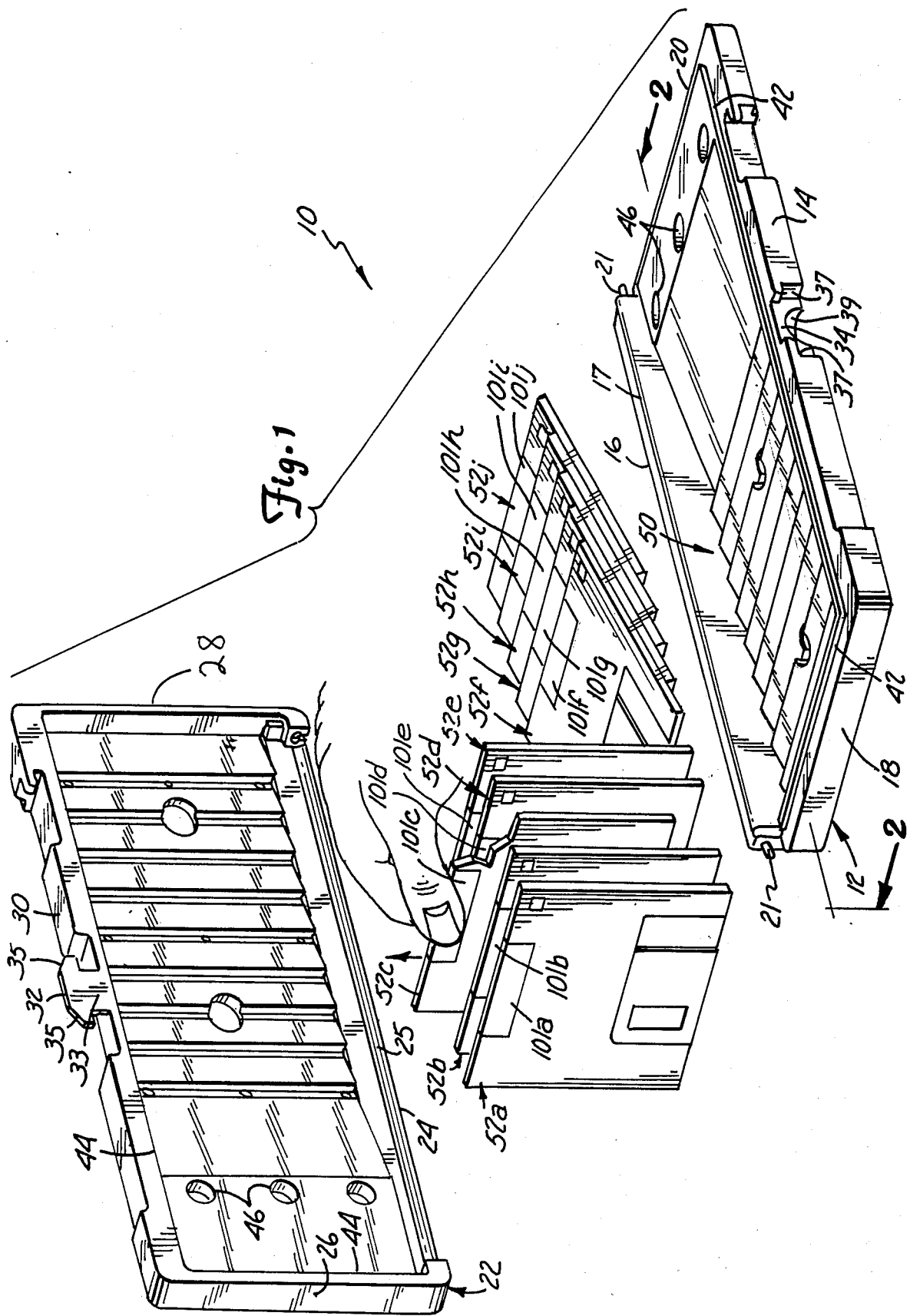

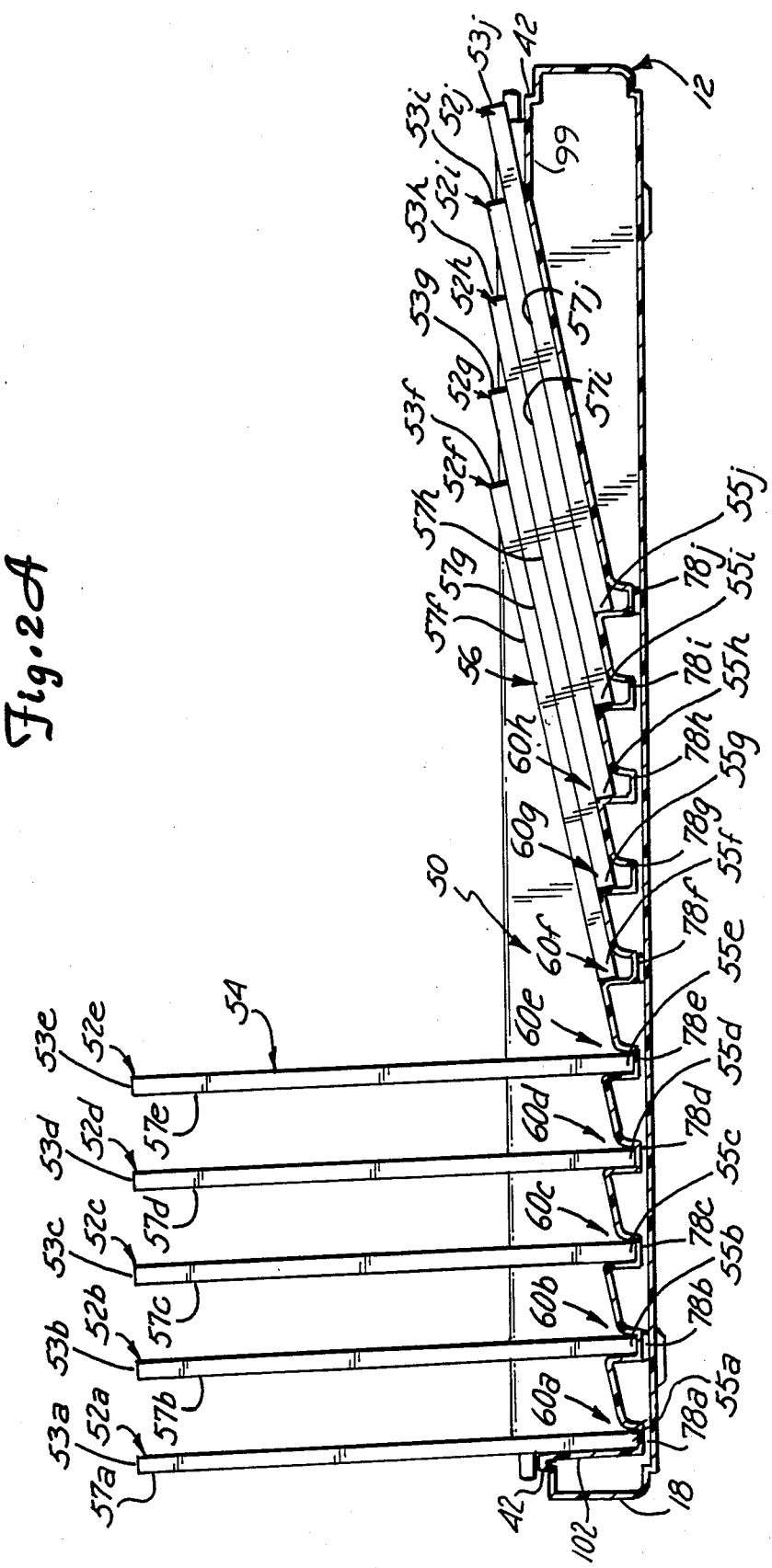

STORAGE CONTAINER FOR DISKETTES

BACKGROUND OF THE INVENTION

1. Field of the Invention

The present invention relates generally to a filing rack for computer diskettes. More particularly, the invention relates to a filing rack which holds diskettes in upright positions or alternative resting positions.

2. Description of the Prior Art

With the dramatic increase in personal computers in the home and workplace, there exists a need to store and/or transport magnetic recording media, such as computer disks or diskettes, in an economical and convenient manner. The safety and integrity of such media is of utmost importance, and shielding such media from airborne dust particles is also of great concern. In addition, it is highly desirable that such storage means occupy a minimal amount of space both for convenience at the workstation as well as during transport. While these functions are generally provided by a manufacturer's shipping case, there is an additional need to have a convenient means of viewing any user applied labels on the face of individual diskettes which provide information about the recorded contents of such diskettes. Also, easy withdrawal or replacement of a selected diskette from within a group of diskettes is a desirable quality in a storage container.

Storage containers for a plurality of data-bearing cards or disks are known in the prior art. U.S. Pat. No. 4,164,309 to Staats, discloses a document storage and access case for a plurality of groups of documents (for example, microfiche cards or aperture cards) which includes a housing having a plurality of inclined ramps and associated document supports. The ramps are formed as an integral part of the housing or as an insert. Each group of documents rests on a ramp. The group members may be individually gripped and tilted to a forwardly leaning and relatively stable position for providing access to remaining documents of the group. Ledges are additionally provided for supporting selected documents at a changed orientation to identify selected locations within a group of documents.

Staats further discloses document supports. The document supports are generally planar, substantially rigid members with portions projecting into recesses positioned between risers and ramps. Each of the recesses extends across only a portion of the width of the ramp. The document support may be tilted to a forward or rearward leaning position by moving over center. Staats' storage and access case is not optimal for use with computer diskettes because the nearly vertical position of the stored material results in an excessively bulky container.

U.S. Pat. No. 4,312,548 to Posso discloses a drawer-like storage unit for audio cassette cases wherein the drawer unit includes separator partitions fastened to the bottom and side walls and inclined downwardly to the rear and upwardly to the front, in order to define compartments in which the cases may be stored in inclined positions. The partitions are inclined by 20° to 30° with respect to vertical. This arrangement is not optimal for computer diskettes, since diskettes are too thin to allow an adequate edge surface for indicia. Further, this arrangement does not expose an adequate surface area of the major face of the diskette to display sufficient information regarding the contents of the diskette.

U.S. Pat. No. 4,307,809 to Haswell discloses a tape cassette storage container including a rigid backing frame member and a series of successive adjacent storage compartments or pockets for individual tape cassettes in which the cassettes are stored generally edge-to-edge. In this edge-to-edge storage design, the cassettes lie generally parallel or at a slight inclination to the plane of the backing frame member. While the Haswell edge-to-edge arrangement does allow for viewing of indicia applied to a major face of stored cassettes, such a configuration is not optimal for storage of 3½ or 5¼ inch computer diskettes in that edge-to-edge spacing is excessively lengthy.

Additionally, blow-molded, dust tight double wall storage cases for individual video cassettes are known. Representative examples include: U.S. Pat. No. 4,177,896 which discloses a recessed hook for hanging boxes from a horizontal support member, U.S. Pat. No. 4,153,178 which discloses a double acting latch, and U.S. Pat. No. 4,211,337 which discloses a hinge structure.

SUMMARY OF THE INVENTION

The present invention is a filing rack for a plurality of diskettes. The filing rack includes slots to trap each diskette retained therein in an upright position and ramps to partially support each diskette in an alternative resting position. A pair of radius surfaces is associated with each slot to translate a portion of a horizontal force on a front face trapped diskette into a lifting force which frees the diskette from the slot and allows the diskette to move from its upright position to its resting position.

Each slot has a first generally upright surface, a bottom surface and a second generally upright surface. One of the radius surfaces for each slot is concave with respect to the slot and connects the first surface of the slot and the bottom surface thereof. The second radius surface of each slot is convex with respect to the slot and connected to the second surface of the slot. An inclined ramp is inclined upwardly away from the slot and connected to the second radius surface of the slot.

In a preferred embodiment, the rack is formed within a base member, and a cover member is provided which may put the base member to define a chamber therein enclosing the filing rack and any diskettes supported thereby in its resting position. Preferably, the rack is integrally formed with the base member. Preferably, the cover member includes a complementary rack which is effective to lock a plurality of the diskettes in their resting positions when the cover member is mated to the base member. When mated together, the base member and cover member define a chamber which is substantially dustproof.

BRIEF DESCRIPTION OF THE DRAWINGS

FIG. 1 is an exploded perspective view of the diskette storage container of the present invention shown in an open position and an array of diskettes.

FIG. 2A is a sectional view of the base portion of the present invention along lines 2—2 of FIG. 1 and an array of diskettes.

DETAILED DESCRIPTION OF THE PREFERRED EMBODIMENTS

Figure 3:
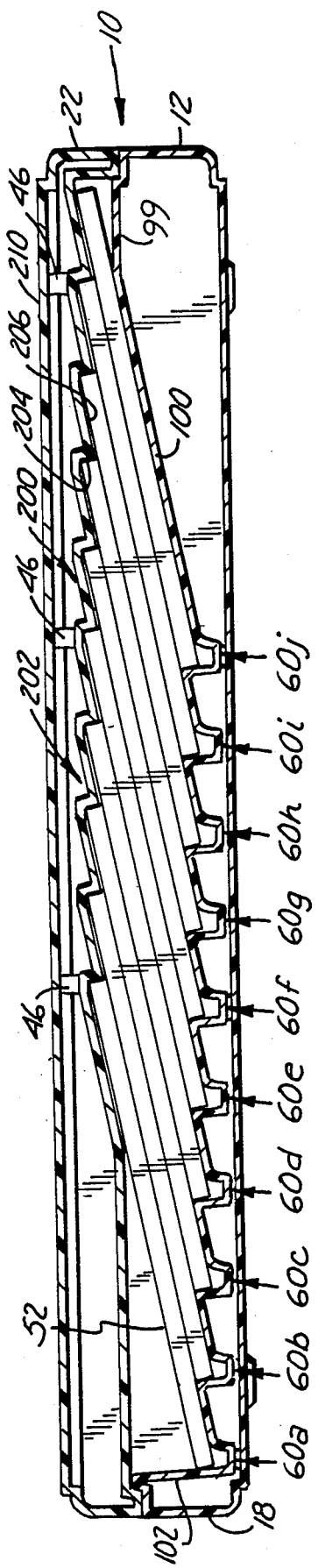
FIG. 3 is a sectional view of the container of the present invention in a closed position along lines 2—2 of FIG. 1 and an array of diskettes.

The container of the present invention 10, shown in FIG. 1, includes a base 12 and a cover 22. Preferably, the base 12 and cover 22 are formed by blow molding of high density polyethylene. The base 12 is generally rectangular-shaped and includes four sides—a first long side 14, a second long side 16 opposite the first long side 14, a proximal short side 18 and a distal short side 20. The second long side 16 includes an upward extension or spine 17.

The cover 22 is detachably, pivotally mounted on the upward extension 17 of the second long side 16. The cover 22 is also generally rectangular-shaped and includes a long hinge side 24. Additionally, the cover 22 includes a proximal short side 26, a distal short side 28 and a second long side 30 opposite the hinge side 24.

The hinge side 24 includes a recess 25 which mates with the upward extension 17 of the base 12 and allows pivoting approximately 120° between a closed position and an opened position The cover 22 can also be detached from the base 12. The base 12 includes a pair of pivot pins 21 protruding from (the upward extension 17. The cover 22 includes a pair of pivot pin receiving slots 23 such that the cover 22 may be removed from the base 12 when in the open position. The interaction of the extension 17 and the recess 25 prevents removal of the cover 22 when partially or fully closed.

An integral latching member 32 resiliently extends from the second long side 30 of the cover 22. The latching member 32 includes a broad flexing area 33. The broad flexing area 33 disperses the stresses of flexing over a substantial area of the high density polyethylene material and thus allows for a desirable "live hinge" which can survive many uses. The latching member 32 also includes a pair of extensions 35 extending proximally and distally from the latching member 32. A latching member receiver 34 is positioned on the first long side 14 of the base 12. The receiver 34 includes a pair of indented notches 37. When the cover 22 is closed on the base 12 such that the second long side 30 of the cover 22 is adjacent to the first long side 14 of the base 12, latching member 32 may be resiliently clipped or snapped into the latching member receiver 34 to hold the cassette storage case 10 in its closed position. This is accomplished by forcing the latching member 32 downward. The latching member 32 pivots or hinges from the broad flexing area 33. The extensions 35 engage the notches 37, thereby latching the container 10 closed. Additionally, the receiver 34 includes a hollow 39. The hollow 39 is centrally located in the receiver 34 and facilitates release of the latching member 32 from the receiver 34 by allowing a user to access the latching member 32 when the latch member 32 is engaged in the receiver 34.

When closed, the container 10 protects or shields any enclosed contents, for example "diskettes," from airborne dust. By "diskettes" is meant not only 3.5 inch format diskettes, but also 5.25 inch format floppy diskettes, "compact disks in rectangular cases," as well as any other plate-like objects having a generally rectangular outer edge which are rigid or semi-rigid. This dust shielding effect is the result of the mating combination of the upward extension 17 and the recess 25, as well as a dust seal lip 42. The dust seal lip 42 extends upward from the base 12 and extends along the first long side 14, the proximal short side 18 and the distal short side 20. The dust seal lip 42 fits against an inner wall section 44 of the cover 22 when the container 10 is closed.

The base 12 also includes a filing rack 50. The filing rack 50 is capable of holding "diskettes" 52 (seen in FIG. 2A as diskettes 52a–j) in a spaced apart, upright position or, alternatively, in a resting position in which the rear face of one "diskette" rests in part against the front face of an adjacent distal "diskette" and in part on a portion of the filing rack. The rack 50, shown in a sectional view in FIG. 2A, extends from the proximal short side 18 to the distal short side 20, and is formed as an integral portion of the base 12. Alternatively, the rack 50 may be formed as a separate unit and subsequently inserted into the base 12. In either alternative, the container 10 is preferably a double-walled unit which provides an increased level of protection from impact to the contents.

The rack 50 is defined by a plurality of repeating units 60. Each repeating unit 60, as shown in detail in FIG. 2B, includes a first surface 62 which is generally vertical. The first surface 62 has a top edge 64 and a lower edge 65 which is connected to a bottom radius surface 66. Extending in a distal direction from the bottom radius surface 66 is a floor surface 68 which includes a distal edge 70 opposite the bottom radius surface 66. Rising substantially vertically from the distal edge 70 of the floor surface 68 is a second surface 72. The second surface 72 extends upwardly to a top radius surface 74 which leads to a ramp surface 76. The ramp surface 76 extends in a generally distal direction, at an angle 75 of approximately 12° to horizontal, rising from proximal to distal. In the preferred embodiment, each repeating unit 60 extends laterally across the rack 50, from the first long side 14 to the second long side 16, and exceeds the width of a diskette 52.

However, in another alternative embodiment, the rack 50 is defined by a pair of spaced apart, parallel rails which have the same general cross sectional appearance as seen in FIG. 2A, but do not extend from one side of the diskette to the other. In the parallel rail alternative embodiment, the space between the rails must remain free of obstructions which interfere with the diskettes in upright or resting positions.

Together, the first surface 62, floor surface 68 and second surface 72 along with the radius surfaces 66 and 74 define an upward facing slot 78 capable of holding or trapping the diskette 52 in an upright position 54. The bottom radius 66 is concave with respect to the slot 78 The top radius 74 is convex with respect to the slot 78. The ramp surface 76 is capable of supporting a portion of a back side 80 of the diskette 52 in a resting position 56. In the preferred embodiment (for a 3.5 inch format diskette), both the lower and upper radius surfaces 66 and 74 have a radius of approximately 1/16 inch (0.16 cm). However, it is believed that the two radii are independent and may range from approximately 1/64 inch (0.04 cm) to approximately ⅛ inch (0.32 cm), and possibly to approximately ¼ inch (0.64 cm). The dimensions of the two radius surfaces 66 and 74, as well as other surfaces 62, 68 and 76 of the repeating unit 60 are dependent on the nature and size of the diskettes to be filed, such that smaller or larger dimensions may be appropriate to a larger or smaller diskette. In this embodiment, the first surface 62 is approximately 0.25 inches (0.64 cm) high, the bottom surface 68 is approximately 0.150 inches (0.38 cm) wide, and the second surface 72 is approximately 0.190 inches (0.48 cm) high.

Each repeating unit 60 (seen in FIG. 2A as units 60a–j), is connected to a subsequent repeating unit in front-to-back fashion, such that the upper edge 64 of the first surface 62 of one unit 60 connects to the distal terminus 77 of the ramp surface 76 of a next unit 60.

The slots 78 (seen in FIG. 2A as slots 78a–j) are approximately 0.15 inches (0.38 cm) in width for use with 3.5 inch (8.9 cm) format micro-floppy diskettes which are approximately 0.13 inches (0.33 cm) thick. Typically, 3.5 inch (8.9 cm) format diskettes are rigid or semi-rigid and have exterior casings of either ABS, copolymer high impact polystyrene (HIPS) or other appropriate thermoplastic material. In an alternative embodiment, the slots 78 may be narrower for use with thinner format 5¼ inch (13.3 cm) floppy diskettes. The spacing center-to-center between the slots 78 is about 0.67 inch (1.7 cm). for use with 3.5 inch (8.9 cm) micro-floppy diskettes.

Figure 2B:
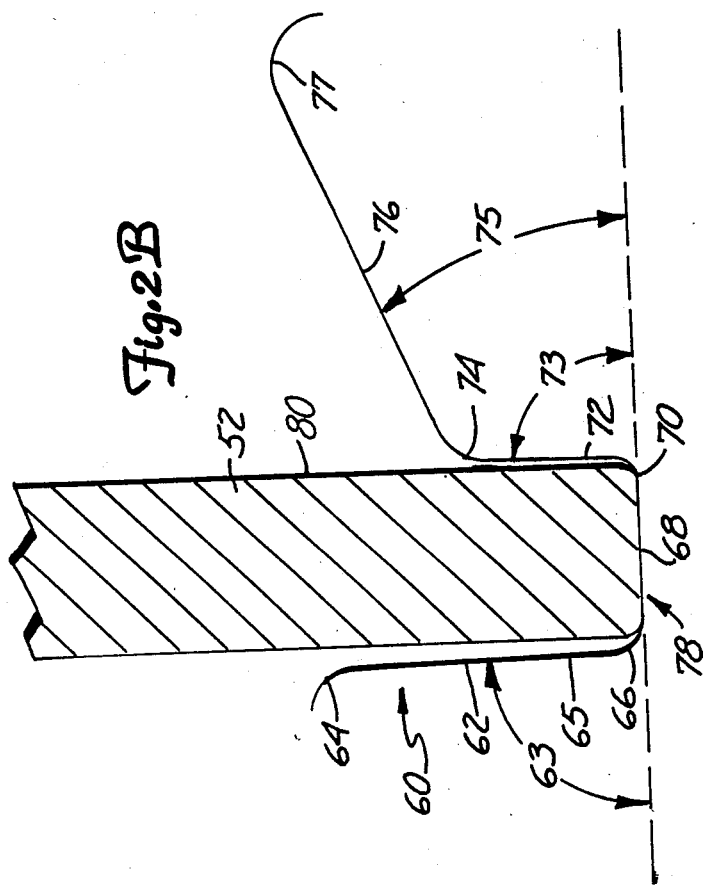
FIG. 2B is an enlarged fragmentary view of a portion of FIG. 2A.

As shown in FIG. 1, this center-to-center spacing allows a user to conveniently remove and/or replace an individual diskette 52c or substitute diskette from amongst an array of diskettes 52a–j in the upright position 54. As shown in FIG. 2B, the first surface 62 forms an angle 63 of approximately 86° with the floor surface 68. The approximately 86° angle is oriented such that the first surface 62 is inclined toward the proximal short end 18 of the base 12, allowing the diskette 52 in the upright position 54 to incline forward. The second surface 72 also forms an angle 73 of approximately 86° with the floor surface 68 and inclines slightly toward the distal short end 20 of the base unit 12. Alternatively, acceptable inclined angles for the first surface 62 and the second surface 72 range from approximately 45° to approximately 89½° from horizontal.

The most proximal slot 78a is defined as a substantially vertical surface 102 which extends to the dust seal lip 42 adjacent the proximal short end 18 of the base 12.

In the embodiment seen in FIG. 2A, ten repeating units 60a–j are used to form ten slots 78a–j. Thus, the rack 50 may support up to ten diskettes 52a–j in an upright position 54 or, alternatively, may support up to ten diskettes 52a–j in the resting position 56. In the resting position 56, each diskette contacts adjacent diskettes, such that a diskette 52j partially supports adjacent diskette 52i. The most distal slot 78j includes a ramp 100 which is longer than the preceding ramps 76. The ramp 100 is connected to the distal short end 20 of the base 12 through a small horizontal surface 99. The additional length of the most distal ramp 100 accommodates most of a 3.5 inch diskette 52j in the resting position 56. The only exception is a small portion of the diskette 52j which extends past the ramp 100 in the region of the small horizontal surface 99. The separation of the diskette 52j from the rack 50 in the region of the small horizontal surface 101 eases translation to the upright position 54 by providing access to the back side of the diskette 52j adjacent an upper edge thereof.

Thus, the rack 50 may be filled with diskettes 52a–j in the resting position 56 of each repeating unit 60a–j. The base 12 may then be covered with the cover 22 to enclose the rack 50 and ten diskettes 52a–j. When the latch member 32 is resiliently clipped to the latch receiving member 34, the container 10 protects the enclosed diskettes 52 from airborne dust particles and other environmental hazards which might destroy the ability to magnetically retrieve information encoded on the diskettes.

When the cover 22 is opened, and, optionally, removed from the base 12, the rack 50 is used to translate the diskettes 52a–j from the resting position 56 to the upright position 54. Specifically, a radial force is applied to the top edge 53j or back near the top edge 53j of the most distal diskette 52j of the rack in the resting position 56. This force pivots the most distal diskette 52j about the radial surface 74 of the slot 78j. The lower edge 55j abuts the first surface 62 of slot 78, when the diskette 52j is in the resting position 56. As the diskette 52j is pivoted toward the upright position 54, the abutting contact between 55j and 62j slips and the lower edge 55j slides toward and across the radius surface 66, eventually resting on the floor 68 of the slot 78j. At the same time, the diskette 52j pivots on and slides over radial surface 74 of the slot 78j. Effectively, the diskette 52j has dropped into slot 78j and is trapped in the upright position 54. The necessary force can be applied by employing a finger, pencil or similar object.

Additionally, the lifting of any diskette, for example, 52i from the resting position 56 to the upright position 54 applies a similar lifting force to an adjacent proximal diskette 52h. However, because the distal diskette 52i becomes trapped in the slot 78i, the application of force through the distal diskette 52i will cease short of the point necessary to fully drop the adjacent proximal diskette 52h into the adjacent proximal slot 78h. Therefore, an additional force must be supplied to the adjacent proximal diskette 52h to drop the diskette 52h into the slot 78h thereby trapping the diskette 52h in the upright position 54. Further, each subsequent adjacent proximal diskette requires this slight additional force to drop into its respective slot. Such additional individual forces can easily be applied, by extending the motion of the finger or suitable force applying object across the tops of the subsequent adjacent proximal diskette 52a–g.

To translate the array of diskettes 52a–j from the upright position 54 to the resting position 56, a distally directed force is applied to the upper portion of the front face 57a of the diskette 52a. This force moves the diskettes 52a–j from the upright position 54 to the alternative, resting position 56. Specifically, the lower edge 55a of the diskette 52a slides across the radius surface 66 in a proximal direction and then upward on the first surface 62. Simultaneously, the radius surface 74 serves as both a pivot surface and a sliding contact for the diskette 52a. In a preferred embodiment, the friction in radius surfaces 66 and 74 is reduced by roughening or texturing the surface. In this manner, the rearward directed force on the diskette 52a is translated into a lifting force, which lifts the diskette 52a upward from the slot 78, thereby freeing the diskette 52a. Once freed from the slot 78a, the diskette 52a is permitted to move toward the resting position 56 and toward engagement with the ramp surface 76.

An adjacent distally located diskette 52b in the upright position 54 will also be contacted by the diskette 52a being translated from upright position 54 to resting position 56. This contact is a sliding contact which applies a similar horizontal force to this adjacent distal diskette 52b and, in turn, to any subsequent distal diskettes 52c–j, such that all subsequently distal diskettes 52b–j will be freed from their respective slots and into the resting position 56. The movement from the upright position 54 to the resting position 56 appears similar to falling dominos, however, unlike dominos, additional force must be applied to lift and free each diskette from the rack 50.

In the resting position 56, a portion of the front face of each diskette 52 is visible, allowing a user to rapidly scan indicia, such as a label 101, applied to this portion of the diskette 52 in the array. In FIG. 1, labels 101a–j are shown, as applied to the upper portions of front faces 57a–j of the diskettes 52a–j. This portion of the face of the diskette 52 is also visible in the upright position 54.

A portion or subgroup of the diskettes, for example, 52a–e in the rack 50 may be translated from the resting position 56 to the upright position 54. Any diskettes 52f–j located distal to the subgroup may remain in the resting position 56. Diskettes 52a–e within the subgroup or proximal to the subgroup will be partially translated toward the upright position 54, but will not be trapped in slots 78a–d unless an additional force is applied.

The cover 22, shown in FIG. 3, also includes a complementary rack 200. This complementary rack 200 is an inner wall in the cover 22. The complementary rack 200 includes a complementary series of ridges 202 The ridges 202 serve to hold the diskettes 52a–j in the resting position 56, when the container 10 is closed and filled with diskettes 52. Specifically, each ridge 202 has a first surface 204 which abuts the upper edge 53 of each diskette 52, and a second surface 206 which is parallel to the face 57 of the diskette 52. The cover 22 also has a series of "stand-offs" or rigid spaces 46 which separate the complementary rack 200 from the outer wall 210 of the cover 22. These "stand-offs" provide protection from impact to the enclosed diskettes. Similar "stand-offs" (not shown) are present in the base.

Figure 4:
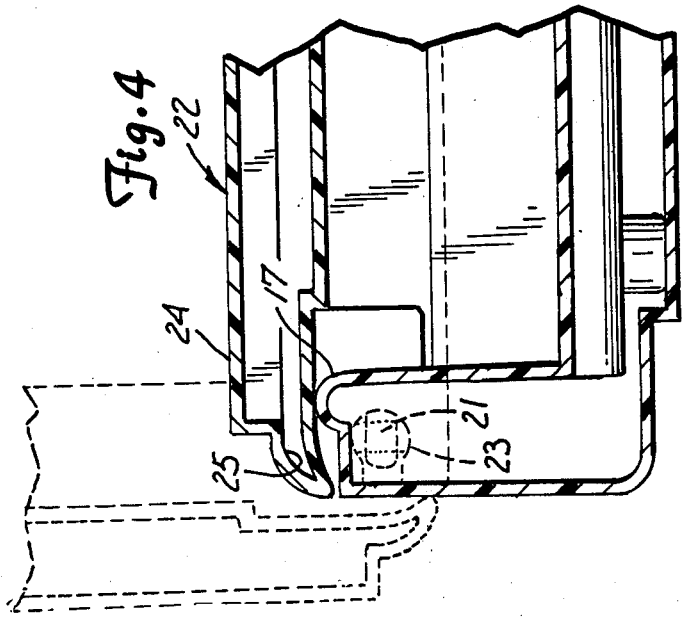
FIG. 4 is a fragmentary sectional view of the present invention along lines 4—4 of FIG. 3.

The hinge portion of the container 10 is shown in greater detail in FIG. 4. The base 12 has an extension 17 with pivot pins 21. The cover 22 has pivot pin receiving slots 23 which allow the cover 22 to be detached in the open position or hinge to the closed position. When closed, the recess ,25 and the extension 17 prevent the detachment of the cover 22 and forms a portion of the seal against airborne dus.

Although the present invention has been described with reference to preferred embodiments, workers skilled in the art will recognize that changes may be made in form and detail without departing from the spirit and scope of the invention.

What is claimed is:

1. A filing rack for a plurality of diskettes, each diskette having a front face and a rear face and the diskettes being arranged in a front-to-back manner, the filing rack comprising:
   means for separately trapping each individual diskette in an upright position, spaced apart from adjacent diskettes;
   means for separately supporting a portion of each individual diskette in an alternative, resting position;
   means for translating at least a portion of a horizontal force applied to the front face of each individual diskette into a lifting force applied to that diskette; and
   wherein the lifting force frees that individual diskette from the means for trapping the individual diskette in the upright position to permit that individual diskette to move to its resting position in engagement with the means for separately supporting a portion of the rear face thereof.

2. The filing rack of claim 1 wherein the diskettes are 3.5 inch format diskettes.

3. The filing rack of claim 1 wherein the means for trapping includes upward facing slots.

4. The filing rack of claim 3 wherein each upward facing slot has a first generally upright surface, a bottom surface and a second generally upright surface, and wherein the means for translating includes a first and second radius surface in each slot, the first radius surface of each slot being concave with respect to the slot and connecting the first surface of the slot to the bottom surface of the slot, and the second radial surface of each slot being convex with respect to the slot and connected to the second surface of the slot.

5. The filing rack of claim 4 wherein the means for supporting includes inclined ramps each having a high end and a low end, the low end of each ramp connected to the second radial surface of a slot.

6. The filing rack of claim 4 wherein the first and second radius surfaces range in radius from 1/64 inch to ¼ inch.

7. The filing rack of claim 6 wherein the first and second radius surfaces range in radius from 1/64 inch to ⅛ inch.

8. The filing rack of claim 7 wherein each of the first and second radius surfaces are 1/16 inch in radius.

9. The filing rack of claim 4 wherein the first and second radius surfaces are roughened.

10. The filing rack of claim 5 wherein the rack is formed of high density polyethylene.

11. The filing rack of claim 5 wherein the rack includes a first slot and a first inclined ramp connected to the second radius of the first slot and a second slot and a second inclined ramp connected to the second radius of the second slot and wherein the high end of the first ramp is connected to the first generally upright surface of the second slot.

12. The filing rack of claim 11 wherein a diskette in the upright position of the second slot prevents a diskette in the first slot from moving to the resting position.

13. A storage container for a plurality of diskettes arranged in a front-to-back manner comprising:
   a base member having an upwardly directed filing rack portion including:
      means for separately trapping each individual diskette in a spaced apart, upright position,
      means for separately supporting a portion of each individual diskette in an alternative resting position,
      means for translating a horizontal force applied to the front face of each individual diskette into a lifting force applied to that diskette,
      wherein the lifting force frees the individual diskette in the upright position to permit that individual diskette to move to its resting position; and
   a cover member mating with the base member in a closed position to define a chamber enclosing the filing rack and any diskette supported thereby in its resting position.

14. The storage container of claim 13 wherein the cover member includes a complementary rack, the complementary rack effective to lock a plurality of diskettes in their resting positions when the cover member is mated to the base member.

15. The storage container of claim 13 wherein the base member and the cover member are formed of high density polyethylene.

16. The storage container of claim 13 wherein the base member is a double wall construction having an outer wall and an inner wall and the filing rack is integral with the inner wall.

17. The storage container of claim 16 wherein the outer wall and the inner wall of the base member are spaced apart.

18. The storage continer of claim 14 wherein the cover member is a double wall construction having an outer wall and an inner wall and the complementary rack is integral with the inner wall.

19. The storage container of claim 18 wherein the outer wall and the inner wall of the cover member are spaced apart.

20. The storage container of claim 13 wherein the chamber defined within the mated base member and cover member is substantially sealed with respect to airborne dust.

21. The storage container of claim 13 wherein the cover member is pivotally coupled to the base member.

22. The storage container of claim 13 wherein the cover member is detachable from the base member.

23. The storage container of claim 13, and further comprising:
    latch means for securing the cover member and base member together when the cover member is mated to the base member in a closed position.

24. A filing rack for a diskette having a front face and a rear face, the filing rack comprising:
    means for trapping the diskette in an upright position;
    means for supporting a portion of the rear face of the diskette in an alternative, resting position;
    means for translating a portion of a horizontal force applied to the front face of the diskette into a lifting force applied to the diskette; and
    wherein the lifting force frees the diskette from the means for trapping the diskette in the upright position to permit the diskette to move to its resting position in engagement with the means for supporting a portion of the rear force thereof.

25. The filing rack of claim 24 wherein the means for trapping include an upward facing slot.

26. The filing rack of claim 25 wherein the means for supporting includes an inclined ramp surface.

27. The filing rack of claim 26 wherein the means for translating includes a first radius surface and a second radius surface.

28. The filing rack of claim 27 wherein the inclined ramp has a high end and a low end and wherein the slot is defined by a first and second surface and a bottom and wherein the first radius surface is concave with respect to the slot and connects the first surface with the bottom and the second radius surface is convex with respect to the slot and connects the second surface to the low end of the ramp surface.

29. The filing rack of claim 27 wherein the first and second radius surfaces are roughened.

* * * * *